July 15, 1958  M. SMOLENSKY  2,843,352
PLUG VALVE

Filed Dec. 7, 1954  2 Sheets-Sheet 2

INVENTOR.
MICHAEL SMOLENSKY
BY Golrick & Golrick
ATTORNEYS

United States Patent Office 2,843,352
Patented July 15, 1958

2,843,352

PLUG VALVE

Michael Smolensky, Cleveland Heights, Ohio

Application December 7, 1954, Serial No. 473,687

1 Claim. (Cl. 251—165)

The present invention relates to straight flow or plug valves, and more particularly to improvements in the plug rotating and seating structure of such valves.

In plug type valves, especially those having a tapered seat in a solid body wherein a matching tapered plug has a substantially circumferential contact, there often arises difficulty in operation of the valve, usually after a long period of service when the valve setting has not been changed, due to sticking or freezing of the plug in the body. Freezing may be due to a wedging of the plug by an axially inward force, but more generally to a liquid film—either originally coating the plug or coming by capillarity between the plug and body—which has become viscous or hard or has caused some corrosion of the valve elements and thereby bound them together rendering the rotation of the plug very difficult or impossible. Mutual wear of the plug and body contact surfaces not only deteriorates the valve but augments the tendency to freeze.

Since plug valves are generally used in locations and for service where setting of the valve is infrequent, the tendency toward freezing is often pronounced and constitutes a disadvantage that often outweighs the economy of initial cost and the ruggedness of a plug valve.

An object of the present invention is to provide a plug valve structure whereby the tendency of such freezing to render the valve inoperative is minimized or entirely obviated. Another object is the provision of a plug valve which may be operated with relatively little effort even after long service at one setting. Another object is the provision of a plug valve wherein economy of metal and of precision machining operations on the plug seat may be attained. A still further object is the provision of a plug valve wherein plug and seat wear is minimized. Other objects and advantages of this invention may be seen from the following description and the drawings wherein:

Figure 1:
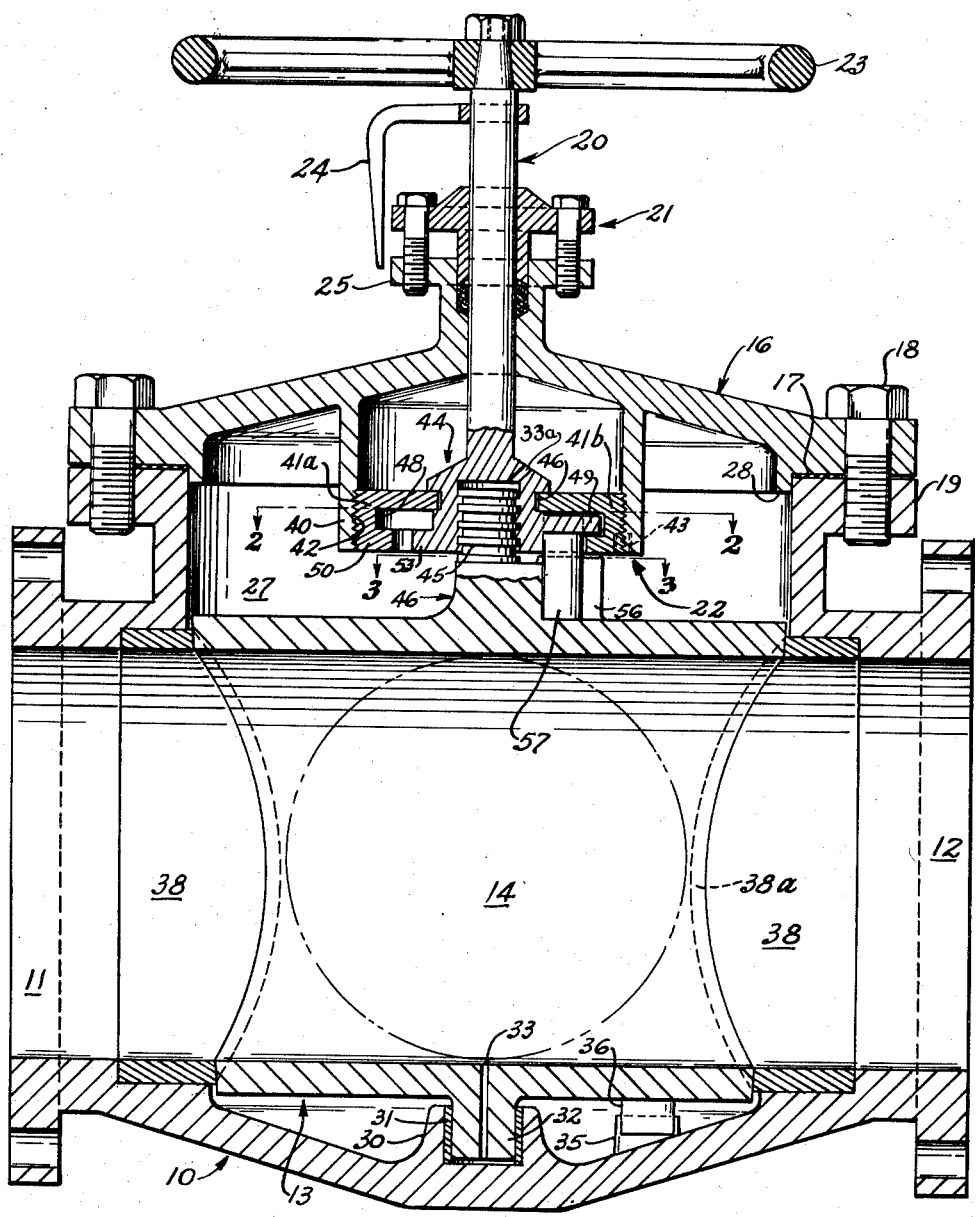
Fig. 1 is a vertical section of the valve taken through the valve plug and valve ports axes.

The primary valve elements and their relation may be best seen in Fig. 1 of the drawings, the valve being comprised of an upwardly open hollow cast metal body 10 having flanged axially aligned inlet and outlet 11, 12; a tapered plug 13 with transverse cylindrical flow passage 14 alignable at open position with the inlet and outlet and presenting solid plug surfaces to the inlet and outlet when in full closed position in the usual manner; a valve bonnet or cap 16 sealed by gasket 17 and bolts 18 to the flanged rim 19 about the top opening of the body; a valve stem 20 extending through an aperture in and sealed to the bonnet by a packing box and gland structure 21; and a mechanism 22, hereinafter described, for imparting certain forces and motions from the valve stem to plug.

The usual valve hand wheel 23 is secured to the upper end of the stem 20, and to the latter there is secured a valve setting or plug position indicator 24 depending adjacent the edge of upper bonnet flange 25 whereon position indicia may be marked.

The interior surface 27 of the hollow body is cylindrical at least near the top portion to receive a downward annular flange 28 of the bonnet for locating the central stem aperture of the latter, and clearance provided with respect to the valve plug may be obtained by extending the cylindrical form nearly to the bottom end of the plug. On the inside of the bottom of the valve body there is an integrally cast projection 30 bored to receive a bearing bushing 31 coaxial with the stem aperture or the bonnet and stem 20, for journalling the cylindrical stub extension or pivot 32 coaxial on the plug with the plug taper. A channel 33 in the plug pivot leading from plug opening 14 initially releases air and during service liquid from the bottom of the bore in body projection 30. A lug 35 on the bottom of the body extending into the path of lug 36 depending from the plug, serves as a stop for the plug at full open position as shown; and as a stop for closed position a second body lug 35a is provided to stop the plug at a position a quadrant clockwise from that shown.

The inner end portions of the inlet and outlet openings 11, 12 are counterbored to receive the like close fitting tubular cylindrical inserts 38 which project beyond the interior surface of the body into contact with the plug. The projecting end edge 38a of each insert is formed by grinding or other fabricating operation to a surface which is a portion of a conical surface matching the conical taper of the plug. These inserts may be seated in the counterbores by press fitting and then simultaneously finished on the ends to the requisite shape, or they may be preshaped and then fitted in proper orientation in the valve body. The resultant small area of sealing contact of the plug with the valve body through the mediation of the inserts, that is, at the insert end surfaces 38a, permits easier starting of the plug due to the small frictional area and for the same reason less tendency to bind or freeze.

The mechanism 22 includes certain parts in the bonnet assembly and on the plug. A depending cylindrical skirt or annular wall 40, integral with the bonnet and coaxial with the stem aperture therein and hence with stem 20, is internally threaded at its lower end to receive a centrally apertured diametrically split disk insert comprised of generally similar left and right halves 41a, 41b with a male threaded rim 42. To secure the disk, socket head set screws 43 or the like are threaded into tapped holes drilled into the threaded junction of the lower end of skirt 40 and the disk. On the lower end of stem 20 an enlargement 44 is axially bored and threaded to receive the lefthand male threaded portion 45 of the integral head structure 46 extending from the top of the plug. A circumferential groove 46 of the stem enlargement forms upper and lower shoulders embracing the upper aperture of the composite disk 41a–b, whereby the stem 20 is axially fixed and located relative to the valve body.

The bottom of the composite disk is in effect counterbored and, on the inner circumference, undercut to form an internal groove 48, accommodating a radially extending arm portion 49 of the stem enlargement, and a radially inwardly extending circular flange 50 at the bottom of the disk which is arcuately recessed at 51 (see Fig. 2) to permit a radially outward movement of pin 57 as later described. Recess 51 is approximately semicircular corresponding to the size of the pin and is located on a radius at right angles to the axis of the valve ports 11, 12. From the bottom of the stem below arm 49, a radial flange 53 extends outward in spaced relation to and at the level of disk flange 50, over almost a complete circle. A stem vent 33a from the threaded bore serves a similar purpose as vent 33.

A lateral extension 55 of the plug head 46, with radial end slot 56 directed parallel to the axis of the plug opening 14, serves as a carrier for a round pin or roller 57 so that the pin is translated about the valve stem axis upon rotation of the plug. As viewed from the top of the valve (Fig. 2), the counter-clockwise side of arm 49 is inwardly slotted, obliquely to a radius, to give a recess 58 wherein the upper end of pin 57 may be engaged under certain conditions with the stem arm 49 to connect stem and plug for rotation of the latter by the former, the recess 58 extending downwardly through the thickness of metal corresponding to flange 53.

Figure 2:
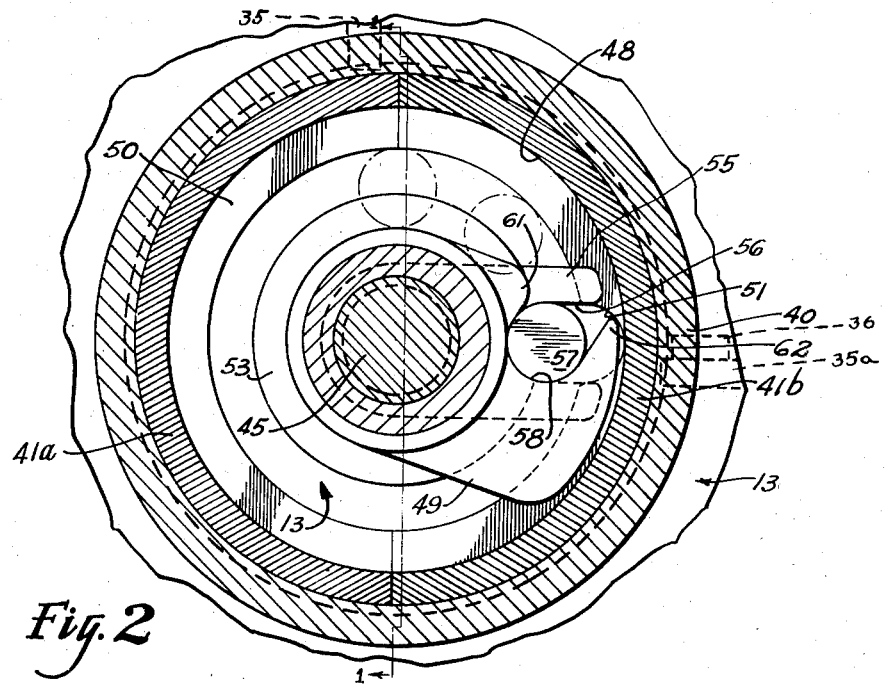
Fig. 2 is a fragmentary enlarged horizontal section taken along line 2—2 in Fig. 1, showing in detail the relation of certain parts of the valve bonnet, stem and plug.
Figure 3:
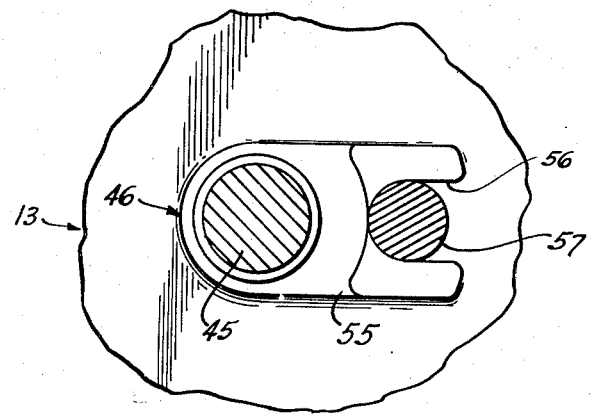
Fig. 3 is a fragmentary enlarged section taken at the line 3—3 in Fig. 1 to show certain details of the connection between plug and valve stem.

In Fig. 1, the valve is at full open position, the dashed circle indicating the location of the plug passage at closed setting. In Fig. 2, the elements shown in full are at positions generally corresponding to a rotation of the plug a quadrant clockwise from Fig. 1 to a closed position determined the aforementioned closed setting body stop 36a, with pin 57, for the sake of clarity, shown out of the recess 51 and the mutual location of pin, stem arm 49, and slotted plug head extension 55 that which obtains at all rotational settings from full open up to the moment just before the fully closed position of the plug is attained. The dashed circles 45° and 90° counter-clockwise from the full line showing of pin 57 indicate respectively partly open and full open positions of the pin, the locations of stem arm and plug extension which are the same with respect to the pin and each other as the full line showing—being omitted for clarity.

Thus the spacing of flange 50 and the shape of the bottom of recess 58 is such with respect to the diameter of pin 57 that upon swinging the plug and stem toward any open setting counter-clockwise from the position of Fig. 2, the pin clears the flange 53. Upon clockwise rotation of the stem toward the plug position shown in Fig. 2, in actual operation as the pin reaches the counter-clockwise side of recess 51, the oblique inner side and the arcuate corner 61 of recess 58 cam the pin outwardly into arcuate recess 51 of flange 50, and as the plug comes to be held at closed position with slot 56 aligned with recess 51 by abutting lugs 36, 35a, the full width of the stem flange 53 comes by the radially displaced pin to hold the latter in the recess 49, thereby locking the plug at full open position. The over-ride in the valve stem rotation past plug closed position results in relative rotation of the plug and stem, and the threaded connection therebetween moves the plug downwardly into a tightly seated relation with inserts 38.

When the stem is turned counter-clockwise from closed position, the small arm edge 62 at the outer end of recess 58 passes between the pin, the outer wall of the recess as a thrust shoulder camming the pin radially inward into slot 56, unlocking the plug from the body and locking plug and stem together for rotation toward an open position, the plug being stopped at full open position by the stop 35 previously described. The free counter-clockwise rotation of the stem, in picking up the pin and thereby the plug, causes rotation of the stem relative to the plug until the pin is out of recess 51, and such relative rotation, by virtue of the left hand threaded connection lifts the plug slightly from the inserts 38 before the stem and plug are locked together.

The pin 57 may serve, by coming to bear upon disk 41 and the top of the plug as further means to limit the relative rotation of stem and plug during opening in addition to the geometrical relation of pin 57, recess 58 and slot 56 in rotational sense.

Thus freedom of the plug is assured, any adherence of plug to body being easily broken due to the mechanical advantage resulting from the threaded connection, the application of lifting force toward the open end of the plug taper of about 3°, and the slight area or contact. Further the plug clears the inserts 38 for rotation to avoid plug and seat wear.

I claim:

In a plug valve wherein there is a valve body, a tapered rotatable valve plug structure having a tapered valve seat fit in the valve body, a stem supporting cap for the body, a valve stem supported by the cap, a threaded connection between the plug structure and the stem, said valve body having a branch sealed by the cap with an internal diameter greater than the diameter of the plug whereby the plug may be inserted in the valve body, said cap being fitted in said body branch and having an internally threaded annular wall depending into the branch of considerably less diameter than the internal diameter of the branch, a threaded split insert comprising two halves of a hollow disk structure threadedly supported by the internal threads of the depending annular wall of the cap at the bottom of the depending annular wall, the bottom portion of the stem being engaged by the split insert to prevent vertical shifting of the stem and having a cam formation housed within a centrally disposed annular cavity within the two halves of the insert, means securing the insert halves to the depending annular wall of the cap with the cam formation of the stem disposed therein, interlocking means disposed between the stem cam and plug structure whereby the stem upon valve-opening rotation thereof may first effect axial movement of the plug structure relative to the body and thereafter turn the plug structure, and said insert having an upper annular flange formed thereon engaging an annular groove formed in the stem to receive the axial thrust of the stem when raising or lowering the plug.

References Cited in the file of this patent

UNITED STATES PATENTS

| | | |
|---|---|---|
| 922,265 | Culver | May 18, 1909 |
| 1,084,186 | Whitehouse | Jan. 13, 1914 |
| 2,076,838 | Heggem | Apr. 13, 1937 |
| 2,258,723 | Smolensky | Oct. 14, 1941 |
| 2,682,174 | Heinen | June 29, 1954 |

FOREIGN PATENTS

| | | |
|---|---|---|
| 6,706 | France | Dec. 11, 1906 |